United States Patent [19]
Wu et al.

[11] Patent Number: 5,744,722
[45] Date of Patent: Apr. 28, 1998

[54] DECONVOLUTION METHOD OF RESONANCE DETECTION AND REMOVAL FROM CRANKSHAFT SPEED MEASUREMENTS

[75] Inventors: Zhijian James Wu, Rochester Hills; John Fiaschetti, Warren, both of Mich.

[73] Assignee: Chrysler Corporation, Auburn Hills, Mich.

[21] Appl. No.: 719,304

[22] Filed: Sep. 16, 1996

[51] Int. Cl.⁶ .................................. G01H 11/08; G01H 13/00
[52] U.S. Cl. .................. 73/659; 73/660; 73/117.3; 73/431.03; 73/431.08; 73/551.01
[58] Field of Search .................. 73/35.05, 117.3, 73/659, 660; 364/431.01, 431.03, 431.08, 551.01; 123/419

[56] References Cited

U.S. PATENT DOCUMENTS

| | | | |
|---|---|---|---|
| 4,849,894 | 7/1989 | Probst | 364/431.01 |
| 5,200,899 | 4/1993 | Ribbens et al. | 364/431.08 |
| 5,303,158 | 4/1994 | Kuroda | 364/431.08 |
| 5,387,253 | 2/1995 | Nemboski, Jr. et al. | 73/117.3 |
| 5,436,556 | 7/1995 | Komninos | 324/76.23 |
| 5,560,336 | 10/1996 | Takahashi et al. | 123/419 |

OTHER PUBLICATIONS

"Real Time Estimation of Engine Torque for the Detection of Engine Misfires" by Francis T. Connolly and Giorgio Rizzoni, Transactions of the ASME, Journal of Dynamic Systems, Measurement, and Control (Dec. 1994) vol. 116 pp. 675–686.

*Primary Examiner*—Hezron E. Williams
*Assistant Examiner*—Rose M. Miller
*Attorney, Agent, or Firm*—Mark P. Calcaterra

[57] ABSTRACT

The present invention provides a system for detecting and removing resonance from crankshaft speed measurements comprising signal demodulation and deconvolution processing. According to the invention, a crankshaft speed sensor sends an appropriate signal corresponding to crankshaft speed to an engine controller. The input signal with resonance noise is subjected to a demodulation operation in N demodulation subsystems for resonance detection and identification. Also, the input signal with resonance noise is subjected to a deconvolution operation in N deconvolution subsystems for resonance noise removal. The demodulated signals are compared to a given set of criteria for selecting a desired signal subsystem. The desired demodulated signal subsystem is then used to screen the deconvolved signal so that only a matching deconvolved signal exits the system as the system output. Accordingly, the signal from a deconvolved signal subsystem matching the selected demodulated signal subsystem is selected as the system output. By properly identifying the desired signal subsystem during demodulation and suppressing resonance noise during deconvolution, the system output signal has an enhanced signal-to-noise ratio. Hence, the output signal is better suited for further processing, such as engine misfire detection, than according to the prior art.

11 Claims, 4 Drawing Sheets

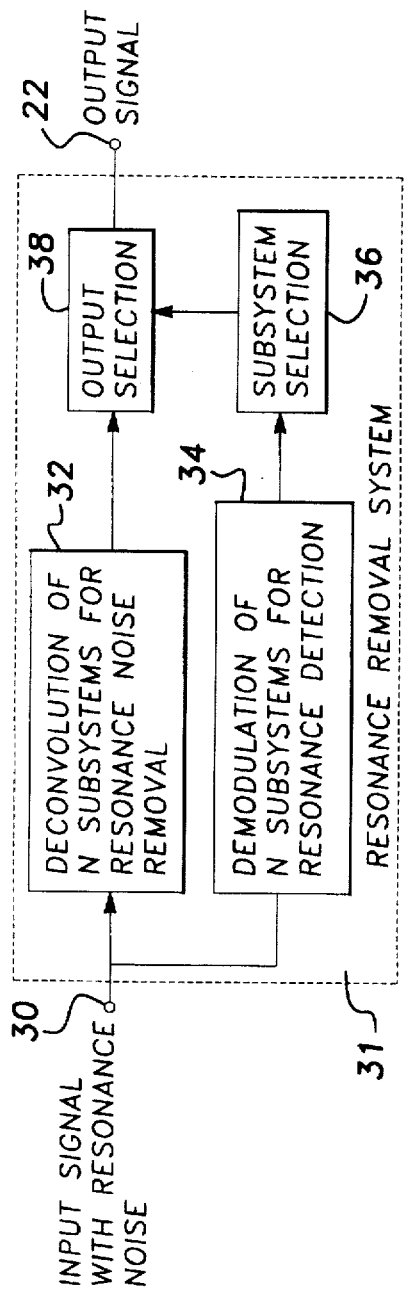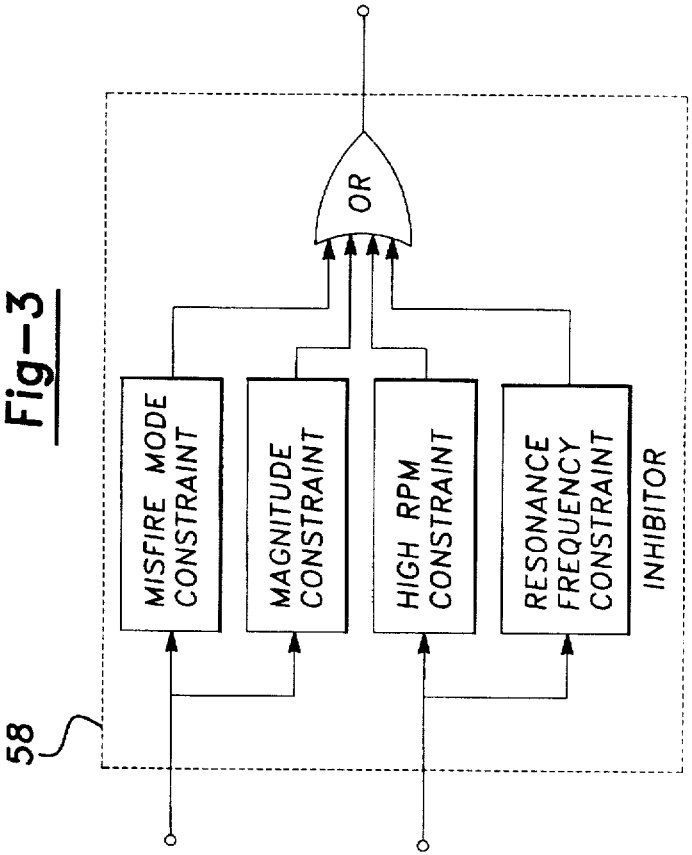

DECONVOLUTION METHOD OF RESONANCE DETECTION AND REMOVAL FROM CRANKSHAFT SPEED MEASUREMENTS

BACKGROUND OF THE INVENTION

TECHNICAL FIELD

This invention generally relates to detecting and removing resonance embedded in signals. More particularly, the present invention relates to a system for detecting and removing resonance from crankshaft speed sensor signals using deconvolution and demodulation processing.

DISCUSSION

As is generally known in the art of signal processing, a signal may be corrupted in various ways during detection, measurement, or transmission. For example, a signal is often superimposed, multiplied, or modulated by a noise signal or is convolved with an undesired system. Regardless of the presence of additive or non-additive noise in the above examples, each degrade the signal's signal-to-noise ratio. The corrupted signal may include so much "noise" that a desired signature may not be easily and directly recovered for subsequent applications. Thus, there is a need for a system which processes a particular corrupted signal to remove and suppress noise. The present invention is particularly useful for detecting and removing resonance noise from crankshaft speed measurements.

Resonance in crankshaft speed measurements is caused by the resonance characteristic of powertrain dynamics when an impulse type signal excites the system. For instance, a large drop in speed due to misfire excites the powertrain and generates damped oscillation in speed. In addition, other sources, such as engine knock, rough road or sudden change of engine load may also generate resonance noise in the signal. In misfire detection, resonance noise caused by a large drop in speed due to misfire may result in false detection of the misfire. This occurrence is particularly common when the drive gear engaged is high and the engine speed is low.

According to the prior art, normal filtering techniques are used to remove many common noises and undesired signals. However, this method does not effectively and efficiently remove or suppress the non-additive noise such as resonance interference, in particular, when the resonance frequency is time-varying. It is therefore desirable to provide a system for detecting and removing resonance from crankshaft speed measurements which dynamically models the process of resonance generation so that the resonance can be removed or suppressed from the signal using deconvolution methods while enhancing the signal-to-noise ratio of the desired signal.

SUMMARY OF THE INVENTION

The above and other objects are provided by a system for detecting and removing resonance from crankshaft speed measurements comprising signal detecting, demodulation, and deconvolution processing. According to the invention, a crankshaft speed sensor sends an appropriate signal corresponding to crankshaft speed to a resonance removal system in an engine controller. With the system in the engine controller, the input signal with resonance noise is subjected to a demodulation operation for resonance detection and identification. Also, the input signal with resonance noise is subjected to a deconvolution operation for resonance noise removal. The demodulated signals are compared to a given set of criteria for selecting a desired signal subsystem. The desired demodulated signal subsystem is then used to screen the deconvolved signal subsystems so that only a matching deconvolved signal exits the system as the system output. Accordingly, the signal from the deconvolved signal subsystems best matching the selected demodulated signal subsystem is selected as the system output. By properly identifying the desired signal subsystem during demodulation and suppressing resonance noise during deconvolution, the system output signal has an enhanced signal-to-noise ratio. Hence, the output signal is better suited for further processing, such as engine misfire detection, than according to the prior art.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 3 is a diagrammatic illustration of a system for detecting and removing resonance from an input signal according to the present invention.

FIG. 5 is a diagrammatic illustration of a constraint process according to the present invention.

DETAILED DESCRIPTION OF THE PREFERRED EMBODIMENTS

Figure 1:
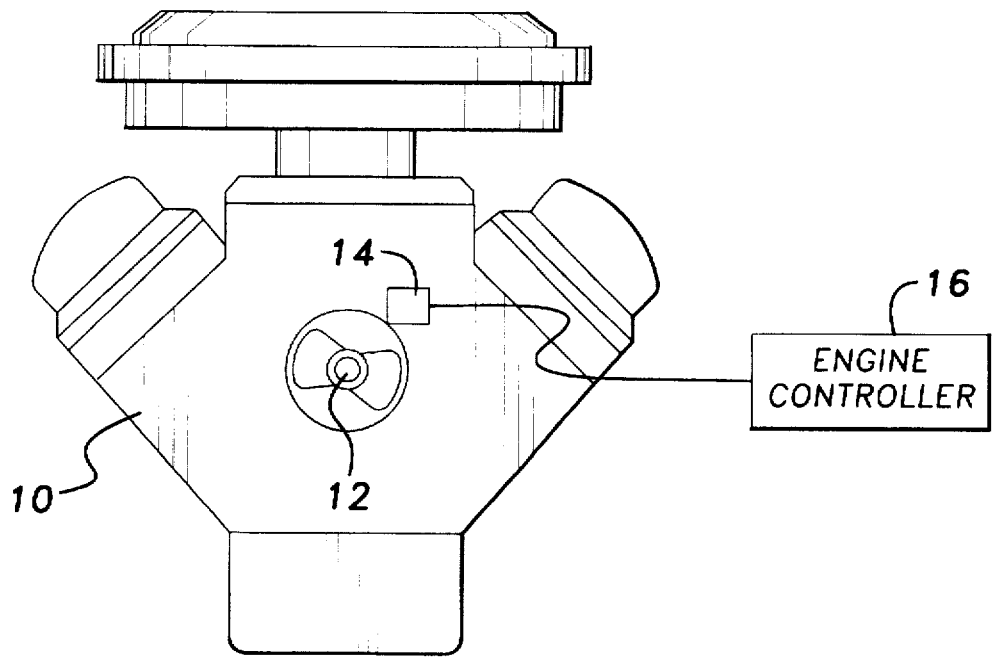
FIG. 1 is a schematic view of a motor vehicle engine and an engine controller including the resonance removal system for resonance detecting and removing according to the present invention.

Referring now to FIG. 1, a system for detecting and removing resonance from crankshaft speed measurements is shown. As is generally known in the art of signal processing, a signal may be corrupted in various ways. Accordingly, the desired signature may not be easily and directly removed or suppressed from its corrupted signal. In engine misfire detection based on crankshaft speed fluctuation, resonance noise can mimic or mask a desired misfire signature in speed signals. The present invention enhances the desired signal and suppresses undesired resonance noise.

Still referring to FIG. 1, an internal combustion engine is shown at 10. The internal combustion engine includes a crankshaft 12 located therein. A crankshaft speed sensor 14 is disposed adjacent the crankshaft 12 for detecting engine speed as a function of crankshaft RPMs. This is accomplished by the crankshaft speed sensor 14 sending an appropriate signal corresponding to the crankshaft speed to an engine controller 16. The engine controller 16 operates on the signal to determine the engine speed. From the signal sent by the crankshaft speed sensor 14, other important information can be gained. For instance, engine misfire can be detected by interpreting signal characteristics.

Figure 2:
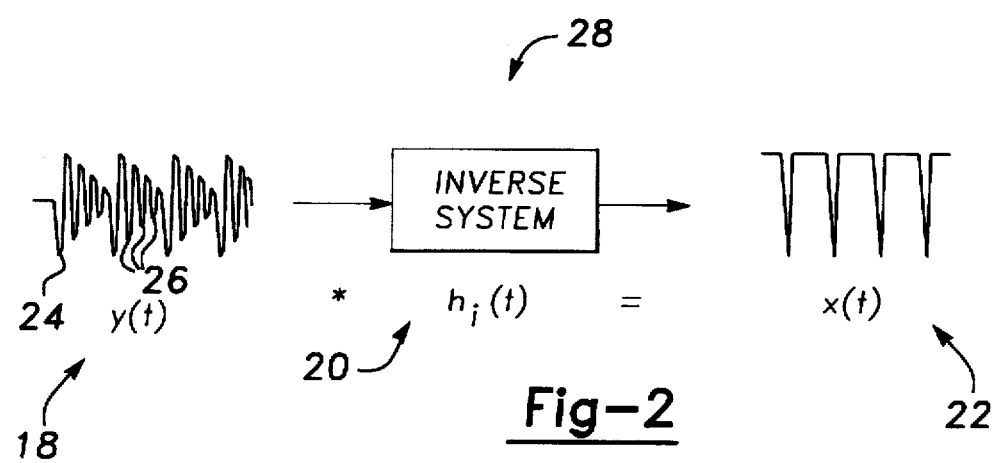
FIG. 2 is a diagrammatic representation of a deconvolution method of resonance removal.

Referring now to FIG. 2, an input signal 18, represented by y(t), is shown as it is subjected to an inverse system 20 within the engine controller 16 (FIG. 1) for further processing. According to the present invention, the resonance corrupted signal 18 is subjected to deconvolution and demodulation operations within a resonance removal system (FIG. 3) in the engine controller 16 using a model of the inverse system 20, represented by $h_i(t)$, in order to enhance the desired signal and suppress the resonance noise. The result is an output signal 22, represented by x(t), which corresponds to the desired signal.

As can be seen in FIG. 2, the input signal 18 includes a desired signal 24 corresponding to input pulses obtained from the crankshaft speed sensor 14. The input signal 18 also includes resonance signals 26 which mask the desired signal 24. The resonance signal 26 results from an input pulse corresponding to a speed drop due to misfire. According to the present invention, the resonance noise, or non-desired signature 26, is removed from the input signal 18 to provide an output signal 22 with a high signal-to-noise ratio. In this way, the desired signal 24 is reconverted and freed from the resonance corruption and false detection.

As described in greater detail below, the present invention, generally indicated at 28, enhances the desired signal 24 while non-desired signals 26 are suppressed. The resonance characteristics are time-varying and are difficult to fully predetermine before the signal is received. Thus, the mechanical resonance process is dynamically modeled from the input signal 18. Then, the input signal 18 is convolved with its inverse process. In other words, the impulse response of a resonance system is determined from the input signal 18. The input signal 18 is then subjected to a deconvolution operation utilizing the determined impulse response.

In this method, the input signal 18 is sent to N forward systems with different resonance characteristics and then sent to N identical square-law detectors. This process completes N parallel demodulation operations, and the resulting demodulated signals are subsequently compared. It should be noted that N represents the number of parallel processes to be performed within the system and that the integer N is dependent on many factors including process parameters, economic constraints and state of the art. The forward system which corresponds to a maximum output represents a resonance system most closely matching the resonance characteristics in the input signal.

At the same time, the input signal 18 is also sent to N inverse systems of the above forward system. This essentially accomplishes a deconvolution operation of the input signal with resonance. The output signal 22 is selected from the deconvolved signal from the inverse system which corresponds to the selected most closely matching resonance system.

Referring now to FIG. 3, a general operation of the present invention is shown. An input signal 18 including resonance noise therein is delivered from the crankshaft speed sensor 14 to the input node 30 of the resonance removal system 31. From the input node 30, the methodology advances to a block 32 and block 34 for simultaneous deconvolution and demodulation processing of the input signal 18.

At the block 34, there are N subsystems. Demodulation operations are performed in all the subsystems at the same time for resonance detection and subsystem identification. The N demodulation subsystems yield N signals having identifiable signal characteristics. At the block 32, there are also N subsystems. Deconvolution operations are performed in all the subsystems at the same time for resonance noise removal.

After the input signal 18 with resonance noise has been subjected to demodulation at the block 34, the methodology advances to a block 36 for selecting a desired subsystem. At the block 36, the N signals are compared to predetermined criteria stored in the memory of the system. Although several criteria may be used, the described process utilizes the maximum magnitude of the N signals from the N subsystems as a criteria to determine the desired subsystem. This means that the resonance in the input signal 18 is compared and most closely matched to this subsystem.

From the blocks 32 and 36, the methodology continues to a block 38, for selecting a desired output signal 22. At the block 38, the deconvolution subsystem signal corresponding to the selected demodulation subsystem is picked as the system output signal 22. As such, the resonance noise is more effectively filtered out as compared to the signals from other deconvolution systems. As should be appreciated, the demodulated signal subsystem selected at the block 36 serves as the criteria for selecting the output signal 22 at the block 38 from the N deconvolved signals from the block 32. It should be noted that a predetermined tolerance is incorporated into the process for selecting the deconvolved signal subsystem according to the demodulated signal subsystem.

Figure 4:
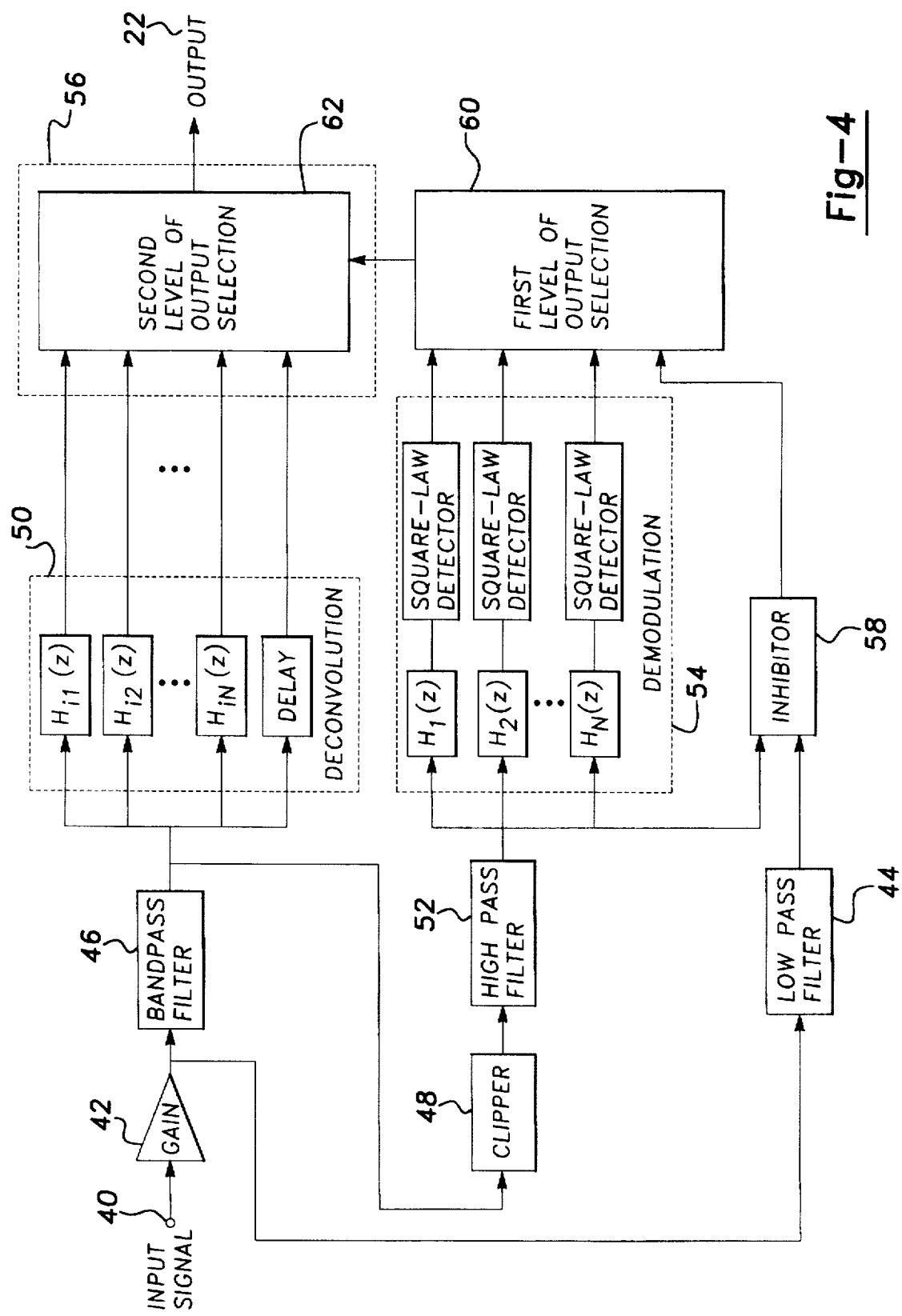
FIG. 4 is a more detailed diagrammatic illustration of a method for resonance detection and removal from an input signal.

Turning now to FIG. 4, the general operation for detecting and removing resonance from crankshaft speed measurements is shown in greater detail. As described above, the crankshaft speed sensor 14 delivers an input signal 18 to the resonance removal system 31. Within the system 31, the control methodology operates on the input signal 18 by subjecting it to various filters to remove noise and undesired signals. The methodology enters through an input node 40 where the input signal 18 is received in the resonance removal system 31. The methodology advances from the node 40 to a block 42 and then to a block 44 and a block 46.

At the block 42, the signal 18 is subjected to a gain where the signal is scaled to a level for easy implementation in a microprocessor. The methodology continues from the block 42 to a block 46 where the scaled signal 18 is subjected to a bandpass filter to remove undesired frequency components which are out of the range of the resonance frequency. For instance, DC components of the input signal 18 and other high frequency noise may be removed by the band-pass filter at the block 46.

At the block 44, the scaled signal 18 is subjected to a low pass filter, which has a very narrow cut off frequency, to obtain a signal representing the average crank speed. The signal from the low-pass filter 44 will be used in the inhibitor described below.

After subjecting the signal 18 to the band-pass filter at the block 46, the methodology advances to a block 48 for shaping the input signal 18 prior to demodulation processing. Also, the methodology advances from the block 46 to a block 50 wherein deconvolution processing of the input signal occurs.

At the block 48, the scaled input signal 18 from the block 46 is "clipped" as desired when an input value associated with the scaled input signal 18 is outside of a range of predetermined values. For instance, a scaled input signal 18 having an input value less than zero is clipped so that the input signal 18 has a minimum amplitude equal to zero. It should be noted that the particular range of values used for clipping parameters is dependent upon the particular system in which the present invention is implemented.

From the block 48, the methodology advances to a block 52, where the scaled and clipped input signal 18 is subjected to high-pass filtering. The high-pass filtering removes the DC components from the signal. After high-pass filtering in the block 52, the methodology advances to a block 54, where the preprocessed input signal 18 is subjected to a demodulation operation.

Referring again to the block 50, the scaled input signal 18 is fed from block 46 to N signal subsystems for parallel deconvolution processing. The deconvolution operation suppresses undesired resonance interference within the input signal 18. However, the characteristics of the desired signal subsystems are preserved. Also, the block 50 includes a delayed bypass to allow signals with insignificant resonance interference to pass without modification. After deconvolution processing in the block 50, the methodology advances to a block 56 where the N deconvolved signals are used for selecting an output signal 22.

Referring again to the block 54, the methodology operates to detect and identify the resonance subsystem which most closely matches the resonance characteristics in the input signal 18. The signal from block 52 is fed into N forward resonance systems, i.e., $H_1(Z)$, $H_2(Z)$, . . . , $H_K(Z)$, . . . $H_N(Z)$. Each $H_K(Z)$ has a narrow band pass character and its central frequency is pre-tuned to a resonance frequency. The envelopes of signals from $H_1(Z)$, $H_2(Z)$, . . . , $H_N(Z)$ depend, in magnitude, on how the resonance systems match the resonance characters of the input signal. The N envelopes are obtained using N identical square-law detectors.

It should be noted that the methodology also advances from the block 52 to a block 58 where the input signal 18 from the high-pass filter 52 and from the low-pass filter at block 44 is tested against a series of constraints. As best seen in FIG. 5, the block 58 includes a series of constraints to prevent false operation of resonance removal when no resonance interference exists in the input signal 18 or the frequency of a desired signature is located in the range of resonance frequency to process. For instance, a misfire mode constraint is employed to indicate that a specific misfire mode, in which the signal frequency is in the range of resonance frequency to process and the resonance interference can be neglected, has been detected, thus the resonance removal is not necessary, and the delayed bypass signal is selected in block 56 as the output signal 22. Similarly, the magnitude constraint is employed to force selection of the delayed bypass signal as the output signal 22 when the magnitudes of N demodulated signals are less than a preset threshold. Likewise, a high RPM constraint and a resonance frequency constraint are employed to force selection of the delayed bypass signal as the output signal 22 when RPM is higher than a preset threshold or the frequency is out of the preset resonance frequency range. The signals from the constraint block are either a logic "1" or "0". With logic OR operation of these signals, the output from the inhibitor is a signal "1" or "0" to determine whether the operation of resonance removal has been effective or not, that is, whether one of N deconvolved signals or the delayed bypass signal is selected as the system output 22.

Referring again to FIG. 4, the methodology advances from the block 54 and the block 58 to the block 60 for first level selecting of the system output signal 22. Within the block 60, if the signal from the inhibitor 58 is "0", then none of N demodulated signals is selected and a signal is sent to the block 56 to indicate that the delayed bypass signal will be used as the output signal 22. However, if the signal from the inhibitor 58 is "1", then the magnitudes of the N demodulated signals are compared to select a maximum magnitude. The block 60 sends a signal to the block 56 corresponding to the comparison result to indicate that the system output signal 22 is the deconvolved signal from the inverse system $H_{ik}(z)$ whose forward system $H_k(z)$ in the block 54 has maximum output magnitude, where k is 1,2, . . . , or N and i is the inverse system. From the block 60, the methodology advances to the block 62 where the decision from the first level of output selection is utilized as an output signal identifier during a second level output selection process.

Figure 6A:
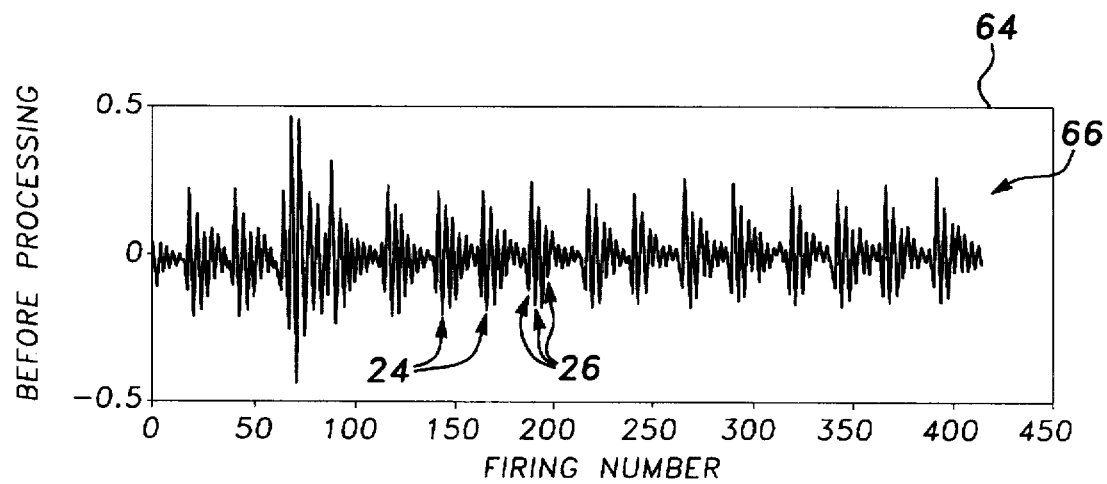
FIGS. 6A and 6B are a graphic illustration of a signal before and after processing according to the present invention.
Figure 6B:
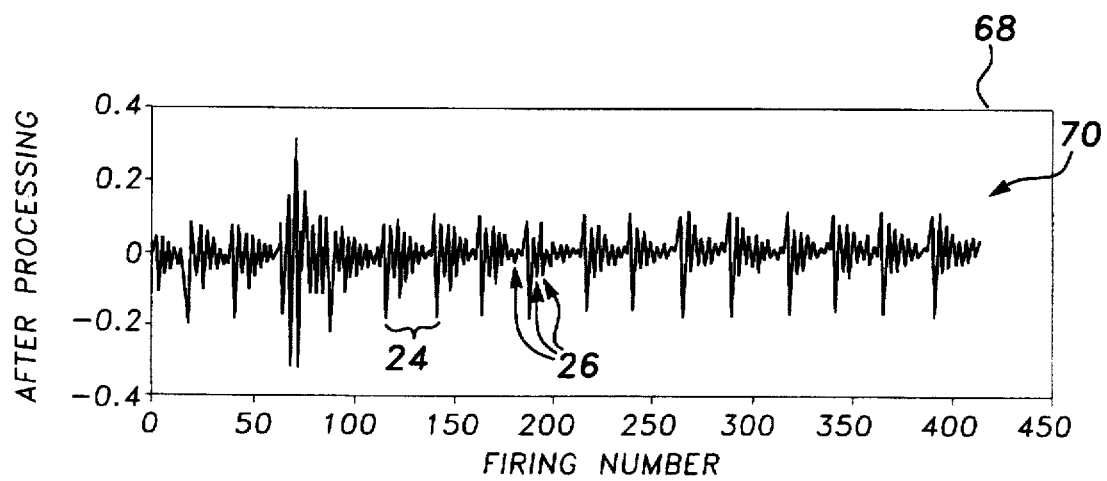

Referring now to FIG. 6, a comparison of signals before and after processing according to the present invention is shown. In the first graph 64, a first signal 66 is shown as the scaled and bandpass filtered signal, at the output of block 46, from the crankshaft speed sensor 14 before further processing by the system for resonance detection and removal. In the second graph 68, a second signal 70 is shown as an enhanced misfire signal from the crankshaft speed sensor 14 after processing by the system for resonance detection and removal. As can be seen, the desired pulse signature 24 is easily identifiable after processing since the undesired resonance interference has been greatly suppressed.

Thus, it can be appreciated that the present invention provides a system for detecting and removing resonance from crankshaft speed measurements. Accordingly, the signal-to-noise ratio of an output signal is greatly enhanced enabling easier interpretation and processing. Furthermore, a desired signature can be recovered from an input signal corrupted by resonance interference whose resonance characteristics are generally unknown. It should be noted that the present invention is not limited only to misfire detection, but could also be used for other applications in which resonance detection or removal is desired.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of resonance detection and removal from crankshaft speed measurements comprising:

measuring a crankshaft speed;

converting said measured crankshaft speed into an input signal;

sending said input signal to an engine controller;

determining an impulse response of a resonance system from said input signal;

subjecting said input signal to a deconvolution operation utilizing said impulse response of said resonance system; and obtaining an output signal representative of an engine performance characteristic from said deconvolution operation.

2. The method of claim 1 wherein said step of determining said impulse response of said resonance system includes subjecting said input signal to a demodulation operation wherein a plurality of input signal resonances matching a set of known resonances are detected and identified.

3. The method of claim 1 wherein said deconvolution operation includes subjecting said input signal to a predetermined number of inverse resonance systems which suppress resonance interference in said input signal.

4. The method of claim 1 further comprising selecting a desired signal from said deconvolution operation as said output signal according to said impulse response of said resonance system.

5. The method of claim 1 further comprising removing predetermined signals from said input signal.

6. A method of detecting and removing resonance from crankshaft speed measurements comprising:

measuring a crankshaft speed;

converting said measured crankshaft speed into a crankshaft speed measurement input signal;

sending said input signal to an engine controller;

subjecting said input signal to a demodulation operation to detect and identify a plurality of demodulated signals, said demodulation operation including comparing resonances of said input signal to a set of known resonances;

subjecting said input signal to a deconvolution operation to obtain a plurality of deconvolved signals from said input signal in which resonance interference is effectively suppressed; and selecting a desired signal from said deconvolution operation as an output signal according to said plurality of demodulated signals from said demodulation operation, said output signal representing engine misfire detection.

7. The method of claim 6 further comprising filtering said crankshaft speed measurement input signal prior to said demodulation and said deconvolution operations.

8. The method of claim 6 further comprising removing DC components, noise, and undesired signals out of a desired range of resonance and desired signal frequencies from said crankshaft speed measurement input signal prior to said selecting said desired signal.

9. The method of claim 6 wherein said selecting step further comprises:

comparing said plurality of demodulated signals from said demodulation operation with predetermined criteria to determine a first level output signal; and selecting said desired signal from said plurality of deconvolved signals as said system output signal, said desired signal being that deconvolved signal best matching said first level output signal.

10. A method of detecting and removing resonance from crankshaft speed measurements comprising:

generating an input signal from a detected crankshaft speed measurement;

filtering said input signal in predetermined ranges;

subjecting said input signal to a demodulation operation for detecting and identifying a plurality of demodulated signals including a set of input signal resonances;

removing predetermined demodulated signals from said input signal;

generating a first level output signal from said plurality of demodulated signals detected and identified in said demodulation operation by comparing said set of input signal resonances to known criteria, said criteria including inhibitor signals;

subjecting said input signal to a deconvolution operation to obtain a plurality of deconvolved signals in which resonance interference is effectively suppressed; and selecting a desired signal from said plurality of deconvolved signals as an output signal according to said first level output signal.

11. The method of claim 10 wherein said predetermined demodulated signals include DC components, noise, and undesired signals outside of a desired frequency range.

* * * * *